United States Patent
Bergenwall et al.

(12) 
(10) Patent No.: US 6,721,291 B1
(45) Date of Patent: Apr. 13, 2004

(54) ANYCAST BINDING MOBILE COMMUNICATION METHOD AND SYSTEM

(75) Inventors: Martin Bergenwall, Espoo (FI); Henry Haverinen, Tampere (FI); Jukka Seppälä, Pirkkala (FI); Tom Soderlund, Helsinki (FI)

(73) Assignee: Nokia IP, Mountain View, CA (US)

( * ) Notice: Subject to any disclaimer, the term of this patent is extended or adjusted under 35 U.S.C. 154(b) by 0 days.

(21) Appl. No.: 09/421,088

(22) Filed: Oct. 19, 1999

(51) Int. Cl.[7] .......................... H04Q 7/00; H04Q 7/24; H04Q 7/20; H04L 12/28; H04L 12/56
(52) U.S. Cl. ...................... 370/331; 370/338; 370/401; 455/432.1; 455/442; 455/436; 455/445
(58) Field of Search ................... 370/310, 328, 370/329, 331, 351, 353, 469, 349, 338, 400, 389, 401; 455/436, 438, 439, 445, 432.1, 435.1, 442

(56) References Cited

U.S. PATENT DOCUMENTS

| | | | | |
|---|---|---|---|---|
| 6,195,705 B1 | * | 2/2001 | Leung | 709/245 |
| 6,215,779 B1 | * | 4/2001 | Bender et al. | 370/338 |
| 6,230,012 B1 | * | 5/2001 | Willkie et al. | 455/435 |
| 6,256,300 B1 | * | 7/2001 | Ahmed et al. | 370/331 |
| 6,400,722 B1 | * | 6/2002 | Chuah et al. | 370/401 |
| 6,418,130 B1 | * | 7/2002 | Cheng et al. | 370/331 |
| 6,434,134 B1 | * | 8/2002 | La Porta et al. | 370/338 |
| 6,473,411 B1 | * | 10/2002 | Kumaki et al. | 370/331 |
| 6,473,413 B1 | * | 10/2002 | Chiou et al. | 370/331 |
| 6,539,225 B1 | * | 3/2003 | Lee | 455/436 |
| 6,628,943 B1 | * | 9/2003 | Agrawal et al. | 455/432.1 |
| 6,654,359 B1 | * | 11/2003 | La Porta et al. | 370/328 |
| 2002/0001290 A1 | * | 1/2002 | Bender et al. | 370/328 |
| 2002/0057657 A1 | * | 5/2002 | La Porta et al. | 370/331 |

FOREIGN PATENT DOCUMENTS

WO    WO 99/31853 A1 * 6/1999 ................. 370/328

OTHER PUBLICATIONS

Geiger et al, Wireless Network Extension Using Mobile IP, Nov./Dec. 1997, IEEE Micro, pp. 63–68.*

* cited by examiner

*Primary Examiner*—Vivian Chin
*Assistant Examiner*—Raymond B Persino
(74) *Attorney, Agent, or Firm*—Antonelli, Terry, Stout & Kraus, LLP

(57) ABSTRACT

This is a method and system to efficiently do handovers for mobile IP. The mobile node registers itself with several foreign agents using a new registration type. Only one of the foreign agents is selected to forward the data packets of a data message to the mobile node. The selection algorithm may be one based on randomness, dynamic learning, message traffic congestion, or statistical information collected at the mobile node.

42 Claims, 2 Drawing Sheets

ANYCAST BINDING MOBILE COMMUNICATION METHOD AND SYSTEM

FIELD OF THE INVENTION

Mobile communications networks are being used to support the Internet. Mobile Internet terminals (mobile nodes) require support as they move within the wireless network. The present invention efficiently solves the problem of mobile Internet connectivity while preserving bandwidth.

DEFINITIONS

| | |
|---|---|
| Care-of-Address | Termination point of a tunnel toward a mobile node, for data packets forwarded to the mobile node while it is away from home. There are two different types of care-of-address: a foreign agent care-of-address is an address of a foreign agent with which the mobile node is registered; a co-located care-of-address is an externally obtained local address which the mobile node has associated with one of its own network interfaces. |
| Foreign Agent | A router on a mobile node's visited network that cooperates with the home agent to complete the delivery of data packets to the mobile node while it is away from home. |
| Home Address | An IP address assigned to a mobile node |
| Home Agent | A router on a mobile node's home each. |
| Host | Any node that is not a router |
| IP | Internet Protocol |
| Interface | A node's attachment to a link. |
| Link | A communication facility or medium over which nodes can communicate at the link layer, such as Ethernet (simple bridged). A link is the layer immediately below IP. |
| Mobile Node | A node that can change its point of contact to a network. |
| Mobility Binding | The association of a home address with care-of-address, for the remaining lifetime of that association |
| Node | A device that implements IP. |
| Packet | An IP header plus payload. |
| Tunnel | The path followed by a data packets while it is encapsulated. While encapsulated a data packet is routed to a knowledgeable agent, that decapsulates the data packet and then forwards it to its ultimate destination. |

BACKGROUND OF THE INVENTION

Mobile communications networks, commonly designated as cellular networks, are rapidly expanding to support more services beyond voice service. One of the new services is the running of Internet Protocols (IP) to support mobile access to the Internet. When mobile users access the Internet and are moving geographically the connection must be handed over between connection nodes to maintain the connection to the Internet. Handovers result from a range limitation due to the geographic limitation of communication distances between nodes within a mobile communication network.

Handovers are likely to occur while the terminal is moving within a wireless network with several access points. Simultaneous bindings are used to ensure that handovers are as smooth as possible. Using this type of binding, data packets are simultaneously routed through several access points within the geographical area surrounding the user's last access point called a mobile node.

The problem with this solution is that excess bandwidth is used because the same data packet is sent through many access points to the terminal. The excess data packets are simply discarded at the terminal resulting in wasted transmission capacity. It is more efficient to send data packets only once to a mobile terminal.

Current Solutions to IP Mobility:

One system for providing mobility to the Internet is described in a paper published in IEEE May 1997 issue at pages 84–99, by Charles E. Perkins, of Sun Microsystems. In addition, an Internet document specifies protocol enhancements that allow transparent routing of IP datagrams to mobile nodes in the Internet and can be found at http://sunsite.auc.dk/RFC/rfc/ rfc2002.html (incorporated herein by reference in its entirety). In his May 1997 article, Mr. Perkins describes Agent Advertisement, Registration, and Tunneling as methods to support mobile IP. He further describes route optimization techniques. The following is an excerpt from Mr. Perkins paper describing the protocol, found at page 86.

"Mobile IP is a way of performing three related functions:

Agent Discovery—Mobility Agents advertise their availability on each link for which they provide service.

Registration—When the mobile node is away from home, it registers care-of-address with its home agent."

Tunneling—In order for datagrams to be delivered to the mobile node when it is away from home, the home agent has to tunnel the datagrams to the care-of-address.

"The following will give a rough outline of operation of the mobile IP protocol, making use of the above-mentioned operations. FIG. 1 (not shown) may be used to help envision the roles played by the entities.

Mobility agents make themselves known by sending agent advertising messages. An impatient mobile node may optionally solicit an agent advertisement message.

After receiving an agent advertisement, a mobile node determines whether it is on its home or a foreign network. A mobile node basically works like any other node when it is at home.

When a mobile node moves away from its home network, it obtains a care-of-address on the foreign network for instance, by soliciting or listening for agent advertisement, or contacting Dynamic Host Configuration Protocol (DHCP) or Point-to-Point (PPP).

While away from home, the mobile node registers each new care-of-address with its home agent, possibly by way of a foreign agent.

Datagrams sent to the mobile node's home address are intercepted by its home agent, tunneled by its home agent to the care-of-addresses, received at the tunnel endpoint (at either a foreign agent or the mobile node itself), and finally delivered to the mobile node.

In the reverse direction, datagrams sent by the mobile node are generally delivered to their destination using standard IP routing mechanisms, not necessarily passing through the home agent (but see the eighth section)."

"When the home agent tunnels a datagram to the care-of-address, the inner IP header destination (i.e., the mobile node's home address) is effectively shielded from the intervening routers between its home network and its current location. At the care-of-address, the original datagram exits from the tunnel and is delivered to the mobile node."

"It is the job of every home agent to attract and intercept datagrams that are destined to the home address of any of its registered mobile nodes. The home agent basically does this by using a minor variation on Address Resolution Protocol (ARP), and to do so in the natural mode it has to have a network interface on the link indicated by the mobile node's home address. However, the latter requirement is part of the mobile IP specification. When foreign agents are in use, similarly, the natural mode of operation suggests that the mobile node be able to establish a link to its foreign agent. Other configurations are possible, however, using protocol operations not defined by (and invisible to) mobile IP. Notice that, if the home agent is the only router advertising reachability to the home network, but there is no physical link instantiating the home network, then all datagrams transmitted to mobile nodes addressed on that home network will naturally reach the home agent without any special link operations."

"FIG. 1 (not shown) illustrates the routing of datagrams to and from a mobile node away from home, once the mobile node has registered with its home agent. The mobile node is presumed to be using a care-of-address provided by the foreign agent:

A datagram to the mobile node arrives on the home network via standard IP routing.

The datagram is intercepted by the home agent and is tunneled to the care-of-address, as depicted by the arrow going through the tube.

The datagram is de-tunneled and delivered to the mobile node.

For datagrams sent by the mobile node, standard IP routing delivers each to its destination. In the FIG. (1) sic, the foreign agent is the mobile node's default router.'

Further background on mobile IP can be found in another paper by Mr. Charles Perkins, Sun Microsystems and David B. Johnson, Carnegie Mellon University prepared for by the Mobile IP Working Group of the Internet Engineering Task Force (IETF), dated Feb. 25, 1999. Online reference: http://search.ietf.org/internet-drafts/. In their paper they describe a system for route optimization in Mobile IP. The system described allows for routing to a mobile node without going to the home agent first to reduce traffic and optimize routing.

Messrs. Johnson and Perkins published another IETF paper on Jun. 25, 1999 setting forth a mobility support protocol IPv6. In it each mobile node is always identified by its home address, regardless of its current point of attachment to the Internet. When a terminal is operating away from home it accesses the Internet via a care-of-address to give the current location. It allows IPv6 nodes to cache the binding of a mobiles node's home address to its care-of-address to send the mobile packets directly to the latter. This protocol envisions searching for neighboring nodes to handover connections but does not solve the problem of duplicate data packets being sent by several nodes to a moving user. The above reference papers describe systems that support mobile IP and the invention disclosed herein. These papers are incorporated herein by reference.

Currently, mobile nodes are serviced using a simultaneous binding. In a simultaneous binding a mobile node has many care-of- addresses. When there is more than one care-of address active for a mobile node, the home agent is instructed to send a duplicated encapsulated datagram to each care-of address for forwarding by multiple foreign agents to the same mobile node.

OBJECTS OF THE INVENTION

An object of the Invention is to provide binding techniques between nodes in a mobile communications network for efficient data transmission to mobile users.

Another object of the invention is to save bandwidth when delivering data packets to mobile users of a mobile network.

Yet another object is to enable efficient access to the Internet by mobile users.

SUMMARY OF THE INVENTION

This invention is a novel binding technique for mobile Internet Protocol (IP). The present use of simultaneous bindings waste bandwidth because all foreign agents forward data packets of a data message to a mobile node. The excess packets are discarded wasting bandwidth. In contrast, the new Anycast binding registers itself in several IP subnetworks simultaneously as before but only one of the foreign agents delivers certain data packets to the mobile node. Because only one foreign agent is selected to deliver the data packets of a data message rather then many, bandwidth is saved.

DETAILED DESCRIPTION OF THE INVENTION

Figure 1:
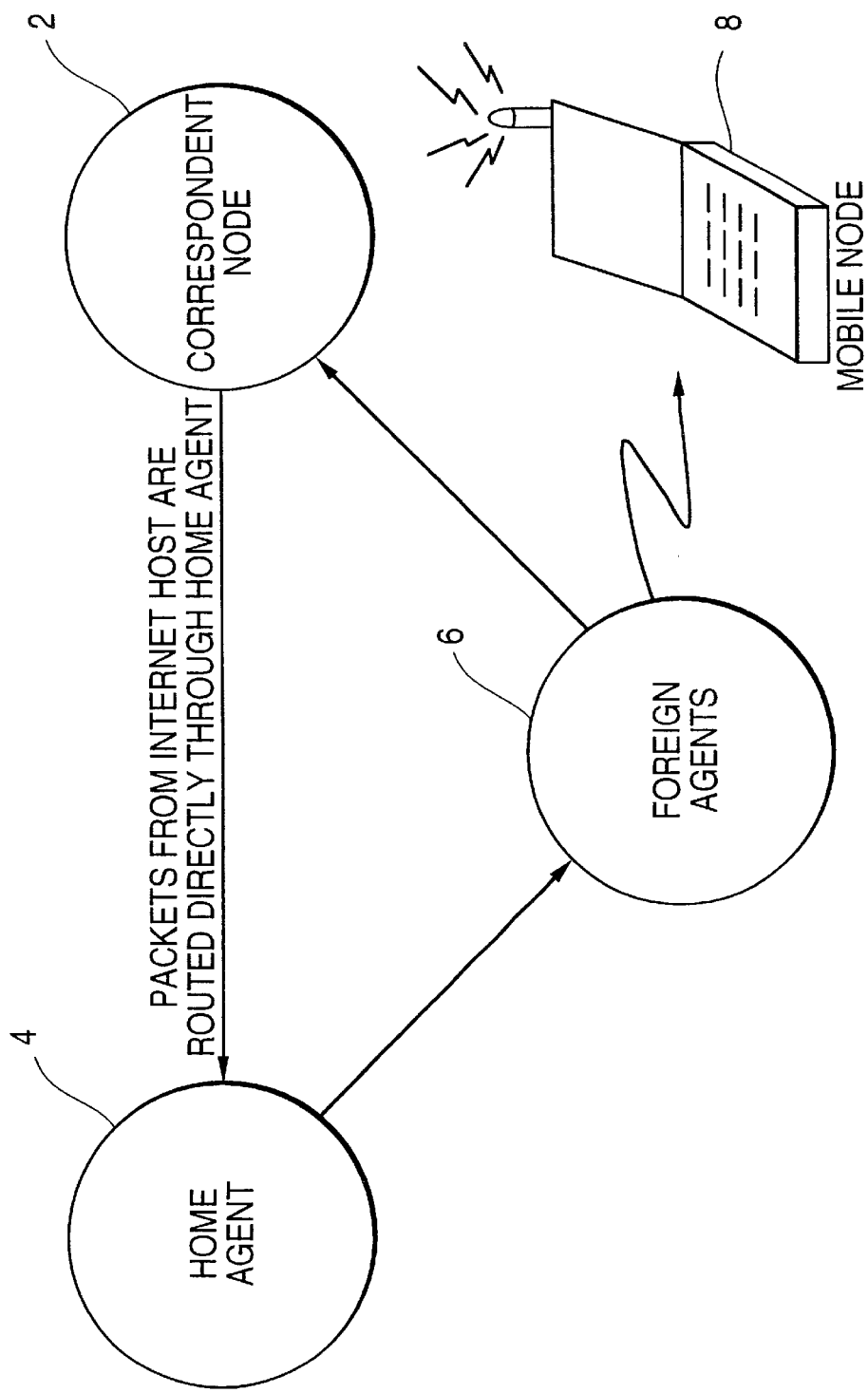
FIG. 1 is a representation of a data message transmission from an Internet Host to a mobile node.

The invention is set forth in the drawings and the following description.

Referring to FIG. 1, the present method of delivering data packets uses an Internet Host 2 to deliver data packets to a mobile network where they are forwarded by home agent 4 to a set of foreign agents 6. The foreign agents 6 simultaneously broadcast the same data packet to a mobile node 8 within their geographic reach. When simultaneous bindings are used to forward data packets to a mobile node 8, multiple foreign agents 6 are used to forward the data packet to the mobile node 8. This system works but uses substantial bandwidth, As described in the papers referenced above, mobile nodes can be serviced the same as a stationary node if they are assigned a new address to identify their location.

Figure 2:
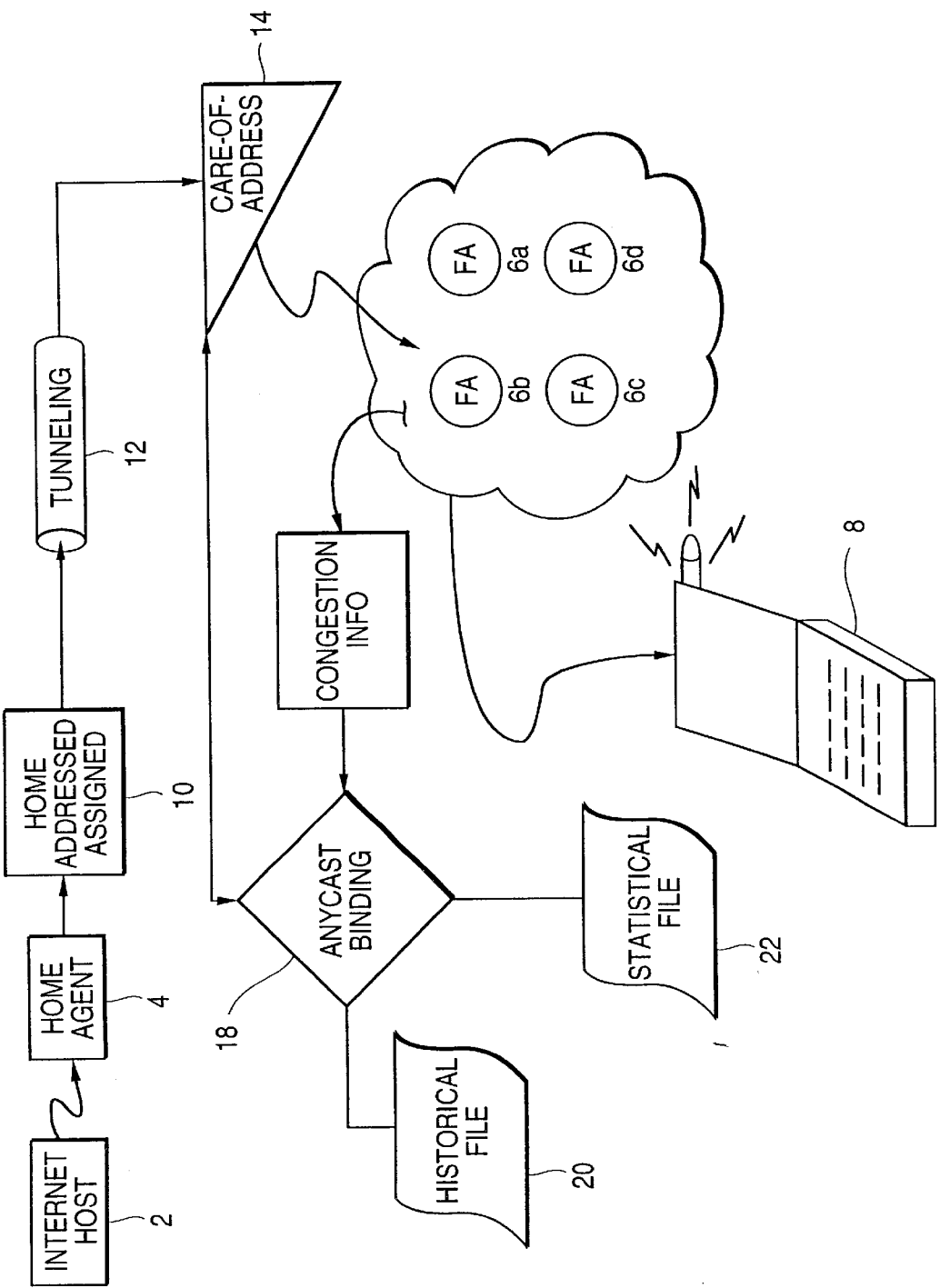
FIG. 2 is a representation of data message routing from the Internet Host through a single foreign agent to a mobile node.

Referring to FIG. 2, in the present invention, the home agent 4 encapsulates the original data packets of a data message and chooses one prevailing care of address 14 using the algorithm of this invention. Only one foreign agent then forwards the data packets of a data message to the mobile node 8. More specifically, referring to FIG. 2, an Internet host 2 communicates over a mobile network as before to a home agent 4. The home address 10 of a mobile node 8 is always the same. Data packets caught by the home agent 4 always include a home address 10 of a mobile node 8. The data packets of a data message are copied and tunneled 12 to each foreign agent 6a, b, c, d using a corresponding care-of-addresses 14 in the encapsulating packets. Both the Anycast Bindings 18 described herein and the presently used simultaneous bindings have many care-of-addresses 14. The difference is in the selection of only one foreign agent 6 to forward the data packets of the data message to the mobile node 8.

With the new Anycast Binding 18, the home agent 4 encapsulates the original data packets of the data message and chooses one prevailing care-of-address 14 using the algorithm hereafter described. With the selection of one care-of-address 14 associated with one foreign agent 6b it alone forwards data packets of the data message to the mobile node 8. In contrast, when simultaneous binding is used to maintain communication with a mobile node 8, the data packets of the data message are copied to all foreign agents 6a, b, c, d thereby wasting bandwidth.

The mobile node 8 binds itself to a set of foreign agents 6a, b, c, d within its geographical area. Anycast binding 18 selects one foreign agent 6b to deliver the data packet to the mobile node 8 as follows.

The home agent 4 makes the choice of the foreign agent to deliver the data packets of the data message from the set bound to the mobile node 8 if a non-hierarchical environment is in place. In a hierarchical environment, an intermediate agent common to all foreign agents 6 bound to a mobile node 8 makes the choice of a foreign agent 6b to forward the data packet to the mobile node 8.

The algorithm that may choose one of the foreign agents 6 in the above environment is set forth below. In its simplest form the Anycast Binding algorithm 18 selects the foreign agent 6b in a random manner from the set of foreign agents 6 bound to the mobile node 8.

Another variation of the algorithm is to consider congestion information 21 of message traffic in the bound foreign agents 6a, b, c, d based on real time or statistical information to select the most efficient foreign agent 6. To support this decision process congestion information 14 is accessed by Anycast Binding 18 for use in its decision algorithm.

Historical information may also be accumulated and stored in a file 20 for access by Anycast Binding algorithm 18, The historical data may be used to predict which of the foreign agents 6 is the most efficient to service a mobile node 8 bound to it.

Also, a statistical file 22 may be created and accessed by the Anycast Binding algorithm 18 to select a foreign agent 6b to forward the data packet to the mobile node 8. The algorithm may include probability predictions of message traffic over a bound set of foreign agents as a basis for assigning a data packets of a data message to a foreign agent for forwarding to a mobile node 8.

A mathematical representation of the algorithm follows:

//Random selection of the destination's care-of-address
//in case of Anycast Binding to be used in a mobile node
//destined packet.
//
address select_coa (address destination)
{
   return a randomly selected care-of-address from
     the set of active Anycast Binding of this destination;
{
//
//Congestion information based selection of the destination's
//care-of-address in case of Anycast Binding to be used in
//mobile node destined packet.
//
//address select_coa(address destination)
{
   return a care-of-address from the set of
     active Anycast Bindings of this destination that
     belongs to the least congested route;
}.

A mobile node 8 capable of sending Anycast Bindings registers with every foreign agent 6 that it can hear. The mobile node also does the book keeping function on the previous hop of the received data packets. With this information the mobile node 8 has information on which foreign agent 6 is giving the most efficient service. This accumulated data is usable in constructing a decision to select foreign agents 6 based on historical usage. This data is also usable by the mobile node 8 to select the next best hop to a foreign agent 8 for the mobile node originated data transmission.

There are several alternatives for implementing the signaling messages for Anycast Bindings 18. A separate Anycast binding 18 could be used, or the existing mobile IP messages can be enhanced to support Anycast Bindings 18. The best method is to use the existing mobile IP registration message and add an extension or by defining a new flag.

The previous description of the invention does not limit it to alternate embodiments that may be used to practice it and is not a disclaimer of these embodiments.

We claim:

1. A method of transmitting data messages in a mobile communication network to a mobile node comprising:
   providing a plurality of foreign agents which are bound to the mobile node in a geographical area;
   selecting only one of the foreign agents to deliver a data message comprising data packets to the mobile node; and
   transmitting the message with the mobile communicating network using only the selected one foreign agent to the mobile node.

2. A method in accordance with claim 1 wherein:
   the selection of only one foreign agent is based upon message congestion criteria.

3. A method in accordance with claim 1 wherein:
   the selection of only one foreign agent is based upon historical data associated with the mobile node.

4. A method in accordance with claim 1 wherein:
   the selection of only one foreign agent is based upon statistical data usage of the mobile node with the plurality of foreign agents.

5. A method in accordance with claim 1 wherein:
   the selection of only one foreign agent is based upon randomness.

6. A method in accordance with claim 1 comprising:
   using a care of address to deliver the data message to the foreign agents.

7. A method in accordance with claim 6 wherein:
   the selection of only one foreign agent is based upon message congestion criteria.

8. A method in accordance with claim 6 wherein:
   the selection of only one foreign agent is based upon historical data associated with the mobile node.

9. A method in accordance with claim 6 wherein:
   the selection of only one foreign agent is based upon statistical data usage of the mobile node with the plurality of foreign agents.

10. A method in accordance with claim 6 wherein:
   the selection of only one foreign agent is based upon randomness.

11. A method in accordance with claim 1 comprising:
   assigning a home address to the mobile node.

12. A method in accordance with claim 11 wherein:
   the selection of only one foreign agent is based upon message congestion criteria.

13. A method in accordance with claim 11 wherein:
   the selection of only one foreign agent is based upon historical data associated with the mobile node.

14. A method in accordance with claim 11 wherein:
   the selection of only one foreign agent is based upon statistical data usage of the mobile node with the plurality of foreign agents.

15. A method in accordance with claim 11 wherein:
   the selection of only one foreign agent is based upon randomness.

16. A method in accordance with claim 11 comprising:
   tunneling the packet with the home address assigned thereto to the plurality of foreign agents.

17. A method in accordance with claim 16 wherein:

the selection of only one foreign agent is based upon message congestion criteria.

18. A method in accordance with claim 16 wherein:

the selection of only one foreign agent is based upon historical data associated with the mobile node.

19. A method in accordance with claim 16 wherein:

the selection of only one foreign agent is based upon statistical data usage of the mobile node with the plurality of foreign agents.

20. A method in accordance with claim 16 wherein:

the selection of only one foreign agent is based upon randomness.

21. A system which transmits data messages in a mobile communication network using the internet protocol to a mobile node comprising:

a plurality of foreign agents;

means for assigning a home address to a data message comprising data packets in the network;

means for assigning a care of address to the data message which is used to deliver the data message to the plurality of foreign agents; and means for selecting only one foreign agent from the plurality of foreign agents; and wherein the mobile communication network delivers the data message from the selected only one foreign agent to the mobile node.

22. A system in accordance with claim 21 wherein:

the means for selecting is an algorithm based upon historical data associated with the mobile node.

23. A system in accordance with claim 22 wherein:

the selection of only one foreign agent is based upon message congestion criteria.

24. A method in accordance with claim 23 wherein:

the selection of only one foreign agent is also based upon statistical data usage of the mobile node with the plurality of foreign agents.

25. A system in accordance with claim 21 wherein:

the means for selecting is an algorithm based upon message congestion criteria.

26. A system in accordance with claim 25 wherein:

the selection of only one foreign agent is based upon message congestion criteria.

27. A system in accordance with claim 21 wherein:

the means for selecting is an algorithm based upon statistical data usage of the mobile node with the plurality of foreign agents.

28. A system in accordance with claim 27 wherein:

the selection of only one foreign agent is based upon message congestion criteria.

29. A system in accordance with claim 21 wherein:

the means for selecting is an algorithm based upon randomness.

30. A system in accordance with claim 29 wherein:

the selection of only one foreign agent is based upon message congestion criteria.

31. A system in accordance with claim 21 comprising:

a home agent in the mobile communication network which forwards the data message toward the mobile node.

32. A system in accordance with claim 31 wherein:

the selection of only one foreign agent is based upon message congestion criteria.

33. A system in accordance with claim 31 wherein:

the forwarding of the data message toward the mobile node, includes tunneling from the home agent to the plurality of foreign agents.

34. A system in accordance with claim 33 wherein:

the selection of only one foreign agent is based upon historical data associated with the mobile node.

35. A system in accordance with claim 21 comprising:

a home address is assigned to the mobile node which is used in transmission of the data message to the mobile node.

36. A method in accordance with claim 35 wherein:

the selection of only one foreign agent is based upon historical data associated with the mobile node.

37. A system in accordance with claim 35 comprising:

the data message is tunneled with the home address assigned thereto to the plurality of foreign agents.

38. A method in accordance with claim 37 wherein:

the selection of only one foreign agent is based upon statistical data usage of the mobile node with the plurality of foreign agents.

39. A system in accordance with claim 21 wherein:

the selection of only one foreign agent is based upon message congestion criteria.

40. A method in accordance with claim 39 wherein:

the selection of only one foreign agent is based upon statistical data usage of the mobile node with the plurality of foreign agents.

41. A method which forwards a data message comprising a plurality of packets from an Internet host to a mobile node in a mobile communication network comprising:

transmitting the data message from the Internet host to a home agent in the mobile communication network;

providing a plurality of foreign agents which are bound to the mobile node in a geographical area;

selecting only one of the foreign agents to deliver a data message to the mobile node; and transmitting the data message from the home agent in the mobile communication network to the mobile node using only the selected one foreign agent.

42. A method in accordance with claim 41 wherein:

the selection of only one foreign agent is based upon historical data associated with the mobile node.

* * * * *